United States Patent [19]
Edler et al.

[11] Patent Number: 5,213,729
[45] Date of Patent: * May 25, 1993

[54] PROCESS FOR PREPARING A DENSIFIED BETA-PHASE SILICON NITRIDE MATERIAL HAVING AT LEAST ONE DENSIFICATION AID, AND THE MATERIAL RESULTING THEREFROM

[75] Inventors: James P. Edler; Bohdan Lisowsky, both of Troy, Mich.

[73] Assignee: Eaton Corporation, Cleveland, Ohio

[*] Notice: The portion of the term of this patent subsequent to Jul. 24, 2007 has been disclaimed.

[21] Appl. No.: 557,371

[22] Filed: Jul. 24, 1990

[51] Int. Cl.$^5$ .............................................. C04B 35/58

[52] U.S. Cl. ........................................ 264/63; 264/65; 501/97; 501/98

[58] Field of Search ...................... 264/65, 63; 501/97, 501/98

[56] References Cited

U.S. PATENT DOCUMENTS

| | | | |
|---|---|---|---|
| 779,474 | 7/1855 | Schifferli, Jr. | |
| 2,268,589 | 1/1942 | Henny | 49/78.1 |
| 2,869,215 | 1/1959 | Smith | 25/156 |
| 3,205,080 | 9/1965 | Ryshkewitch | 106/44 |
| 3,222,438 | 12/1965 | Parr et al. | 264/66 |
| 3,669,723 | 6/1972 | Parr et al. | 117/105.2 |
| 3,819,786 | 6/1974 | May | 117/105.2 |
| 3,887,412 | 6/1975 | Styhr et al. | 156/89 |
| 3,950,464 | 4/1976 | Masaki | 264/65 |
| 3,991,166 | 11/1976 | Jack et al. | 423/327 |
| 3,992,497 | 11/1976 | Terwilliger et al. | 264/56 |
| 4,033,400 | 7/1977 | Gurwell et al. | 164/98 |
| 4,036,653 | 7/1977 | Jacobson | 106/47 |
| 4,067,943 | 1/1978 | Ezis et al. | 264/86 |
| 4,119,689 | 10/1978 | Prochazka et al. | 264/65 |
| 4,164,528 | 8/1979 | Yajima et al. | 264/262 |
| 4,235,857 | 11/1980 | Mangels | 423/344 |
| 4,285,895 | 8/1981 | Mangels et al. | 264/65 |
| 4,354,990 | 10/1982 | Martinengo et al. | 264/65 |
| 4,356,136 | 10/1982 | Mangels | 264/65 |
| 4,376,742 | 3/1983 | Mah | 264/85 |
| 4,377,542 | 3/1983 | Mangels et al. | 264/265 |
| 4,410,636 | 10/1983 | Minjolle et al. | 501/98 |
| 4,443,394 | 4/1984 | Ezis | 264/65 |
| 4,471,060 | 9/1984 | Dickie et al. | 501/98 |
| 4,519,967 | 5/1985 | Crosbie et al. | 264/86 |
| 4,781,874 | 11/1988 | Edler | 264/65 |
| 4,943,401 | 7/1990 | Edler et al. | 264/63 |

FOREIGN PATENT DOCUMENTS 076549 6/1977 Japan.
081250 5/1983 Japan.

OTHER PUBLICATIONS

Sacks, et al., Properties of Silicon Suspensions and Slip-Cast Bodies, 1985, 1109-1123.
Jahn, Processing of Reaction Bonded Silicon Nitride, 1989, 1-24.
Williams, et al., Slip Casting of Silicon Shapes and Their Nitriding, 1983, p. 607-619.
Mangels, Effect of Rate-Controlled Nitriding and Nitriding Atmospheres on the Formation of Reaction-Bonded $Si_3N_4$, 1981, pp. 613-617.
Moulson et al., Nitridation of High-Purity Silicon, 1975, pp. 285-289.
Shaw et al., Thermodynamics of Silicon Nitridation: Effect of Hydrogen, 1982, pp. 180-181.
Moulson, Reaction-bonded Silicon Nitride: its Formation and Properties, 1979, pp. 1017-1051.

*Primary Examiner*—James Derrington
*Attorney, Agent, or Firm*—P. S. Rulon; L. E. Cargill

[57] ABSTRACT

A process for preparing an alpha-phase silicon nitride material and thereafter sintering to a densified beta-phase silicon nitride material is disclosed which includes comminuting a slurry including a mixture of silicon powder, water, and at least one densification aid to aid in later densifying of the silicon nitride material, the comminuting being performed to form fresh, non-oxidized surfaces on the silicon powder and to allow substantial chemical reaction between the silicon and the water, reducing the water content of the reacted slurry to a degree sufficient to form a resultant dry mass, nitriding the dry mass by exposure to a sufficient amount of a nitriding gas including at least nitrogen at a sufficient temperature for a sufficient length of time to form a mass of substantially alpha-phase silicon nitride, and sintering the resultant silicon nitride mass at a sintering temperature of from about 1450° C. to about 2100° C. for a sufficient length of time to convert the silicon nitride from a predominantly alpha-phase material to a predominantly densified beta phase silicon nitride material exhibiting a decrease in bulk volume of the silicon nitride due to the densification.

60 Claims, No Drawings

PROCESS FOR PREPARING A DENSIFIED BETA-PHASE SILICON NITRIDE MATERIAL HAVING AT LEAST ONE DENSIFICATION AID, AND THE MATERIAL RESULTING THEREFROM

TECHNICAL FIELD

This invention relates generally to methods of preparing a densified beta-phase silicon nitride material and more particularly relates to using silicon which has been chemically reacted with water, combined with one or more compounds which act as densification aids to help later processing. This application also relates to co-pending applications entitled Process For Making Silicon Nitride Articles; Process For Preparing A Nitridable Silicon-Containing Material Having At Least One Densification Aid Including Alumina, And The Material Resulting Therefrom; New Ceramic Phase In Sintered Silicon Nitride Containing Cerium, Aluminum, And Iron; Process For Preparing An Alpha-Phase Silicon Nitride Material And Thereafter Converting To Non-Densified Beta-Phase Material And The Material Resulting Therefrom; Process For Nitriding Silicon-containing Materials; and Process For Preparing A Base Nitridable Silicon-Containing Material And The Material Resulting Therefrom.

BACKGROUND OF THE INVENTION

Silicon nitride has been investigated for the past several decades as a material which meets high critical engineering requirements for high temperature resistance, strength and other properties. Basically, silicon nitride is formed by nitriding silicon powder in an attempt to form high alpha-phase content silicon nitride material. Thereafter, if additional strength is required, the alpha-phase silicon nitride material is sintered at high temperature in an attempt to form densified beta-phase material. However, due to very long nitriding times, attempts have been made to speed up the nitridation, which has unfortunately brought with it a commensurate problem of the formation of high beta-phase silicon nitride material before sintering. This has caused a problem in that only alpha-phase silicon nitride may be sintered into densified beta-phase silicon nitride material. If the starting material is already in the beta-phase, it will not densify, and therefore the strength will be compromised.

Densification of reaction bonded silicon nitride by sintering is one method of manufacturing a sintered beta-phase silicon nitride. Provided that a high alpha phase content silicon nitride material is produced during the nitridation of silicon, and that sintering or densification aids, which act as liquid forming agents, have been incorporated into the silicon compact either before or after nitridation, it is possible to further densify the reaction bonded silicon compact by heating it to a normal sintering temperature range for silicon nitride.

Densification of silicon nitride occurs by the transformation of the alpha phase of silicon nitride into the beta phase of silicon nitride in the presence of a high temperature liquid phase, accompanied by about a 5–15 percent reduction in volume. The liquid phase promotes the conversion of the densified beta phase silicon nitride during the sintering or densification. It has been found that densification does not generally occur without liquid forming agents. When alpha-phase material is subjected to high temperatures in the absence of liquid forming agents, conversion may be directly to beta-phase material without changes in volume, and consequently no densification.

In the past there have been two major problems associated with the sintering of reaction bonded silicon nitride: (1) the requirement for a high percentage of alpha phase content within the starting material, and (2) the extensive time required for preparation and nitridation of the silicon powder. Typically, in order to manufacture a sinterable reaction bonded silicon nitride, very pure silicon has been ground and mixed dry with densification aids for long periods of time, upwards of 48 hours, and then nitrided for long times, on the order of hundreds of hours to weeks. Total fabrication times of 200 to 400 hours is not uncommon. Previously, impure silicon or attempted fast nitriding rates resulted initially in a high beta phase reaction bonded silicon nitride material which would not densify during sintering. These factors have made it difficult to achieve commercial feasibility on a large scale.

Reaction bonded silicon nitride is commonly prepared by reacting and nitriding the silicon (either as a powder or as a formed article) with nitrogen by exposing the silicon to a nitrogen-containing atmosphere at temperatures of about 1000° C. to about 1420° C. for times sufficient to produce the silicon nitride. It is not uncommon for the nitriding time in prior art methods to be 100–200 hours. It is normal for a small amount of nitriding aid (e.g., iron oxide or nickel oxide) to be initially mixed with the silicon powder to enhance the nitridation of the silicon during the nitriding step. This nitridation has traditionally been slow due to long holding times at particular temperatures to avoid overheating and also to avoid the formation of beta-phase material.

It is widely known that if common sintering or densification aids for silicon nitride (e.g., magnesium oxide, yttrium oxide, aluminum oxide, rare earth oxides, etc.) are mixed in initially with the silicon powder, the reaction bonded silicon nitride article, provided it has a high alpha phase content, can be further heated immediately after nitriding to the higher sintering temperature and will thereby be sintered to increase its density and have improved mechanical properties as compared to the original reaction bonded silicon nitride article. The article can be hot pressed, hot isostatically pressed, pressure assisted sintered, or pressureless sintered, and may be covered with a cover powder during the sintering process to prevent any degradation. Boron nitride or silicon nitride, or mixtures thereof are commonly employed as a cover powder over the article during sintering to minimize the decomposition of the reaction bonded silicon nitride article.

During sintering, the alpha phase of the silicon nitride material is converted to the beta phase of silicon nitride. Therefore, high levels of alpha phase silicon nitride needs to be present in the pre-sintered reaction bonded silicon nitride to obtain the desired sintering response. In the past, it has been found that some methods produce a high beta phase material too early in the process to be useful.

U.S. Pat. No. 4,285,895 to Mangels et al. teaches that sintered reaction bonded silicon nitride articles can be made by incorporation of a densification aid into the reaction bonded silicon nitride article, surrounding the article with a packing powder of silicon nitride and densification aid and subjecting the article and powder mixture to a temperature above 1700° C. with a nitrogen atmosphere of sufficient pressure to prevent volatilization of the silicon nitride for a time sufficient to permit sintering of the reaction bonded silicon nitride articles.

Several methods for introducing the densification aid into the reaction bonded silicon nitride article are disclosed in the above referenced Mangels et al. patent. These include (1) the impregnation of the densification aid into the reaction bonded silicon nitride article; (2) incorporation of the densification aid into the cover powder and then relying upon diffusion of that densification aid into the article at the sintering temperature; and (3) incorporation of the densification aid into the silicon powder mix prior to nitriding. The densification aids cited are magnesium oxide, yttrium oxide, cerium oxide, and zirconium oxide. The Mangels et al. patent also teaches that the nitrogen pressure at the sintering temperature may be in the range of 250 to 1500 psi.

U.S. Pat. No. 4,351,787 to Martinengo et al. teaches that sintered silicon nitride articles can be prepared by forming a silicon powder mixture containing one or more sintering additives into a compact, the additives being present in the powder in an amount such as to ensure an additive content of from 0.5 to 20 wt % in the silicon nitride compact; heating the compact under a nitrogen gas blanket at a temperature not exceeding 1500° C. to convert the silicon into reaction bonded silicon nitride; and sintering the reaction bonded silicon nitride compact by heating in a nitrogen gas atmosphere at a temperature of at least 1500° C. Furthermore, it is taught that the silicon powder size is from 0.1 to 44 microns in size and of high purity or containing only very small amounts of nitriding catalysts. The Martinengo et al. patent teaches that any conventional sintering additive may be used. Best results are said to be achieved by using MgO, and especially in combination with $Y_2O_3$. Other preferred additives mentioned in the patent are MgO, $Y_2O_3$, $CeO_2$, $ZrO_2$, BeO, $Mg_3N_2$, and AlN. Other examples of additives are given as $Mg_2Si$, $MgAl_2O_4$, and rare earth additions such as $La_2O_3$. Also iron can be used with advantage, usually in mixture with conventional additives such as MgO, $Y_2O_3$, and $CeO_2$.

As a final example of sintered reaction bonded silicon nitride practice, reference is made to U.S. Pat. No. 4,443,394 to Ezis which teaches a method for making a fully densified silicon nitride body. The basic principle taught is that silicon nitride will not sinter by itself, but requires a liquid phase at the sintering temperature. Ezis found that, by having an yttrium oxynitride and alumino-silicate liquid phase present at sintering temperatures of 1650°–1750° C., the need for an over pressure of nitrogen and cover or packing powder during sintering could be eliminated in order to densify the silicon nitride.

The Ezis patent teaches that, by (1) forming a nitridable mixture of: silicon powder, $SiO_2$ (carried with the Si metal), $Y_2O_3$ and $Al_2O_3$; (2) nitriding the mixture to form a reaction bonded silicon nitride, with consequent formation of a $Y_{10}Si_6O_{24}N_2$ phase, and an alumino-silicate which resides on the silicon nitride grains; and then (3) sintering in the 1650° to 1750° C. temperature range for 5–12 hours, a substantially fully densified silicon nitride is produced which exhibits a 4-point bending strength of 100,000 psi at room temperature.

The Ezis patent further teaches the need for a long ball milling time of 48 hours, preferably dry, a nitridation cycle time of 200 hours, and sintering times of 5–12 hours. Total processing time including the milling can be estimated from the preferred embodiment as approximately 260 hours.

Many of the densification aids mentioned above or others used in the past are relatively expensive, are not always readily available, and require relatively high sintering temperatures for effectiveness.

It is, therefore, a primary object of the present invention to provide improved processes for preparing an alpha-phase silicon nitride material which can later be sintered to form a substantially densified beta-phase material which is more commercially viable than prior art methods, uses materials which are readily available, and is processable in substantially less time than typical prior art methods.

SUMMARY OF THE INVENTION

In accordance with the preferred embodiment of the invention, this and other objects and advantages are addressed as follows. Methods are disclosed for preparing an alpha-phase silicon nitride material and thereafter sintering to form a densified beta-phase silicon nitride material which is formed from less expensive and more readily available materials than prior art materials and which uses considerably less processing time than used in prior art methods.

A method is disclosed for preparing an alpha-phase silicon nitride material which includes comminuting a homogeneous slurry including a mixture of silicon powder, water and at least one densification aid. The comminuting is performed to form fresh, non-oxidized surfaces on the silicon powder and to allow substantial chemical reaction between the silicon and the water. Thereafter, the water content of the reacted slurry is reduced to a degree sufficient to form a nitridable mass before nitriding and sintering the silicon-containing mass.

A method for preparing such a silicon-containing material begins with comminuting (i) silicon powder, (ii) water, and (iii) a sintering or densification aid. Nitriding agents may also be added to aid the nitridation step. A dispersing agent, such as Darvan No. 1 or 6, a registered trademark of the R. T. Vanderbilt Company, Inc., may be added to the slurry initially to aid the comminution. For this invention, it is desirable to achieve a total of 4 to 16 volume percent nitriding and densification additives, based on the final volume of the resultant silicon nitride. Such a level of densification and nitriding additives is helpful to ultimately achieve a favorable sintered silicon nitride article. Comminution of the operative chemical compounds with water is conducted for a period of 1 to 5 hours, to produce a silicon based slurry.

Organic additives such as binders, plasticizers, viscosity modifiers, and dispersing agents may be admixed to the slurry toward the end of the comminution, such as for at least 30 minutes, and before substantially reducing the water content. Preferably, the slurry is then aged in the absence of comminution for a period of 12 to 24 hours to allow the reaction of the silicon with the water to substantially reach completion which is believed to provide a silicon oxyhydride coating on the silicon. Periodic venting allows the release of the build-up of evolving gases from the reacting slurry. The aged slurry may then be dried by spray drying or any other suitable technique and formed into a green body, if desired, such as by compaction of the spray-dried granules. However, certain techniques for forming articles require the slurry to remain wet for formation. These methods are known to those of ordinary skill in the art. Slip casting of the original slip, extrusion, injection molding or any other known method for forming green ceramic bodies may likewise be employed.

DETAILED DESCRIPTION OF THE INVENTION

The processes of this invention generally include a process for preparing an alpha-phase silicon nitride material, as well as the material made therefrom and thereafter sintering to form densified beta-phase material. The material may be made in the form of a powder or an article. The process includes comminuting a homogeneous slurry of a mixture of silicon powder, water, and at least one densification aid, the comminuting being performed to form fresh, non-oxidized surfaces on the silicon powder and to allow substantial chemical reaction between the silicon powder and the water, and thereafter reducing the water content of the reacted slurry to a degree sufficient to form a dry mass.

From about 0.5 to about 15 volume percent of at least one densification aid is added to the original slurry combination of silicon powder and water to aid in the subsequent sintering.

In this method, it is preferable to have the at least one nitriding agent and the densification aid being employed in amounts to achieve about a total of 4 to 16 volume percent based on the volume of the resultant silicon nitride to achieve the preferred results. The slurry components are preferably employed in amounts such that the slurry contains about 10 to about 60 volume percent solids and about 90 to 40 volume percent water, while the solids consist of silicon powder, the at least one nitriding agent, and the at least one densification aid.

In yet another embodiment of this present invention, the densification aid may be added after the silicon powder and water have been comminuted. The addition may take place before the aging step or after. The densification aid may be added at any time during the procedure before the step of reducing the water content of the reacted slurry to form a dry mass. It is not necessary for the densification aid to be comminuted with the silicon powder and the water.

The process of this invention relating to the making of powders and bodies generally begins with comminuting silicon powder with sintering and/or densification aids in the presence of a large amount of water to form a slurry. In another embodiment, other silicon-containing materials may be used including a combination powder of silicon and silicon-containing grog such as alpha-phase silicon nitride. Further embodiments may include nitriding agents. The same methods are followed regardless of the inclusion of the nitriding agent. The silicon powder may be commercial-grade and preferably has a particle size of less than 20 micrometers. For comminuting, any suitable comminution device may be used such as a ball mill, rod mill, vibratory grinder, Union Process grinder, jet mill, cone grinder, jaw crusher, and hammer mill. The slurry is preferably prepared in a ball mill which is 25-50 volume % filled with milling media and 25-50 volume % filled with the slurry and ball milled for more than 2 hours. Ball milling is performed until the predominant silicon powder size is less than about 10 microns.

The preferred at least one densification aid of the present process include aluminum oxide, commonly called alumina, and the rare earth oxides. The elements considered as rare earth elements are Ce, Pr, Y, La, Nd, Pm, Sm, Eu, Gd, Tb, Dy, Ho, Er, Tm, Yb, and Lu. Preferred additional densification aids may be selected from the group consisting of $Y_2O_3$, $MgO$, $ZrO_2$, $LaO_3$, $TiO_2$, $BaO$, $SrO$, $Sc_2O_3$, $B_2O_3$, $BeO$, $Cr_2O_3$, $CaO$, $V_2O_5$, $MnO_2$, $MgN$, $AlN$, $MgSi$, $MgAl_2O_4$, and mixtures thereof. The densification aid component is employed in amounts of about 0.5 to 15 volume percent, and preferably from about 4 to about 12 volume percent, based on the final volume of the resultant dry mass.

The preferred nitriding agents are selected from the group consisting of iron oxides, lead oxides, nickel carbonyl, nickel oxides, silicon carbide, graphite, carbon, aluminum oxides, $Fe_2O_3$, $NiO$, $CoO$, $CaF$, $PbO$, $Li_2O$, $Na_2O$, $K_2O$, $BaO$, $BN$, albite ($NaAlSi_3O_8$), orthclase ($KAlSi_3O_8$), anorthite ($CaAl_2Si_2O_8$), nepheline syenite, talc, borax, soda ash, $Pb_3O_4$, alpha-phase $Si_3N_4$ and mixtures thereof. The nitriding agents are used in an amount from about 0.1 to 7 volume percent based upon the final volume of the resultant dry mass.

The comminuting of the silicon in the presence of water is an important step, as the comminuting creates fresh, unoxidized surfaces on the silicon powder particles for vigorous reaction with the water. Merely mixing silicon powder, whether or not pre-ground, with water does not appear to create the fast, vigorous reaction that comminuting provides. Pre-ground silicon powder is not as reactive toward water because silicon, being a highly reactive metal, readily oxidizes in air during storage. Thus, a passivating layer of silicon oxide is formed on the outside of the silicon particles, thereby rendering the silicon not nearly as reactive as unoxidized silicon such as is created during the comminution step.

After comminuting, the slurry is allowed to react further by aging the slurry. It is believed that the silicon is chemically reacting with the water during the aging step to form, a silicon oxyhydrate coating on the silicon particles and also releasing hydrogen gas as a product of the reaction. During aging, the slip appears to increase in volume by at least 50%, typically doubling its volume through frothing, and, subsequently, the frothing subsides after about 12 hours as the reaction nears completion and the slip develops thixotropic properties.

After aging, the reacted slurry is dried and formed, if desired, in preparation for a subsequent nitriding step. Although the slurry could be slip cast at this point to form a green body or dried for use in extrusion or injection molding of shapes, it is preferred to spray dry the slip to obtain a free-flowing powder for isopressing or dry compression forming using standard powder metal presses. This pressing forms compacted articles called greenware. If binders are used, the compact will have a sufficient strength to allow machining without the need for special heat treatments by partially nitriding or sintering the silicon compact. Preferably, required machining is completed on the silicon green body prior to nitriding, rather than on the harder silicon nitride part.

The powder or the compacted parts are then put into a furnace. The furnace is evacuated and preferably then filled with a combustible gas atmosphere such as pure hydrogen gas. The temperature of the furnace is then increased from room temperature to about 1000° C. over about 1 to 5 hours, while flowing the combustible gas therethrough, by a nearly linear progression of increasing temperature while flowing hydrogen through the furnace at atmospheric pressure to burn off the organic additive materials without causing any substantial damage to the powder or compacted parts. The substantially non-toxic effluent which is vented includes carbon dioxide and water.

The furnace may then be purged with flowing nitrogen to obtain a noncombustible atmosphere and evacuated again to remove the nitrogen and any remaining effluent. Helium gas may be added, preferably until a pressure of 50 KPa absolute is indicated. Then a nitrogen-hydrogen gas blend consisting of 4 weight percent hydrogen and 96 weight percent nitrogen may be admitted to the furnace until the pressure is preferably slightly above atmospheric pressure (approximately 120 KPa absolute) to avoid any leakage of ambient air into the furnace. The nitriding atmosphere comprises from about 40 to about 60 mole percent nitrogen, from about 40 to about 60 mole percent helium, and from about 1 to about 4 mole percent hydrogen.

The temperature is then preferably increased from 1000° C. to a nitriding temperature of between 1350° C. and 1450° C., preferably about 1420° C., at a linear rate of about 5° C. to 50° C./hr, although 15° C. to 25° C. per hour is preferred. During this heating cycle, nitrogen is consumed by the silicon to form silicon nitride. The nitriding atmosphere composition in the furnace atmosphere is kept substantially constant by monitored addition of substantially pure nitrogen gas into the furnace to maintain the slightly greater than atmospheric pressure. Once 1420° C. is reached, the temperature is maintained for less than about 2 hours, and preferably for about 1 hour; then the heat source is shut off and the silicon nitride articles are allowed to cool.

After the nitriding step, the next step involves sintering the resultant silicon nitride mass at a temperature of from about 1500° C. to about 2100° C. for a sufficient length of time to convert the silicon nitride material from a predominantly alpha-phase material to a predominantly densified beta-phase silicon nitride material. The sintering generally includes utilizing at least a nitrogen-containing atmosphere, and more specifically may include nitrogen and helium, nitrogen and hydrogen, nitrogen, helium and hydrogen, or it may include the same atmosphere as the nitriding atmospheric gas used during the nitriding step. The sintering step may also utilize an atmosphere containing substantially pure nitrogen.

The sintering may be performed under vacuum from the end of the nitriding step to the beginning of the sintering temperature hold step, followed by an atmosphere containing at least nitrogen admitted during the duration of the sintering step. In addition, the sintering step may be accomplished while utilizing the above-described sintering atmosphere containing at least nitrogen at a pressure of from vacuum to about atmospheric pressure, or from atmospheric to about 150 psig, and preferably at a nitrogen partial pressure of about 15 psi absolute or greater. Hot isostatic pressing may be accomplished from atmospheric to about 1500 psig up to about 20,000 psig while compacting. Specifically, it is preferred that the sintering be accomplished while heating from the temperature achieved at the end of the nitriding step to the beginning of the conversion step at an increasing rate of from about 250° C. to about 1250° C. per hour until an elevated temperature of about 1450° C. to about 2100° C. is reached. The increasing rate may include from about 500° C. to about 1000° C. per hour until the elevated temperature is reached. Preferably, the increasing rate is at about 500° C. per hour until the elevated temperature is reached.

The sintering is accomplished by maintaining a temperature of between about 1450° C. to about 2100° C., and preferably between about 1650° C. to about 1850° C. until substantially all of the silicon nitride in the alpha phase is converted to densified beta-phase silicon nitride having the desired microstructure depending upon the application. It can be appreciated that the sintering conditions can be tailored to produce various silicon nitride microstructures, and therefore different resultant material properties. The resultant sintered silicon nitride can therefore be tailored for various applications through manipulation of the exact sintering conditions, and this is in keeping with the broad application of the principles herein described. This is done by maintaining the sintering temperature for about 0.3 to about 20 hours until substantially all of the conversion takes place, preferably from about 5 to about 10 hours, and most preferably between about 1 to 2 hours.

After the sintering, a cooling down step may also be included which cools down the resulting densified silicon nitride mass back to room temperature at a rate of from about 250° C. to about 1250° C. per hour, preferably from about 500° C. to about 1000° C. per hour, and most preferably at about 500° C. per hour until room temperature is reached. Samples prepared by this method display excellent properties, low size distortion and high material integrity.

Thus, there is provided in accordance with the present invention a method for preparing a densified beta-phase silicon nitride material which uses materials that are less expensive and more readily available than prior art methods.

The following examples are illustrative only and should not be construed as limiting the invention which is properly delineated in the appended claims.

EXAMPLES

The following examples illustrate the use of various nitriding agents and densification aids with the silicon powder. Some examples describe the combination of iron oxide, yttria, and alumina as the densification aids which act as liquid forming agents to facilitate the densification during sintering.

EXAMPLE 1

Three kilograms of commercial-grade silicon (99% silicon minimum) of size 2.03 Fisher Average Diameter was comminuted with 90 grams iron oxide ($Fe_2O_3$), 300 grams yttria ($Y_2O_3$), 100 grams of alumina ($Al_2O_3$), and 2500 milliliters of distilled water. Comminution was continued for 4 hours in an 11.3 liter porcelain jar mill with 7 kilograms of ¾ inch alumina balls. The mill was vented hourly to prevent excessive pressure build-up in the mill. At the conclusion of the comminuting period, organic additives including 45 grams of polyvinyl alcohol, 15 grams of polyethylene glycol, 30 grams of glycerol, and 7.5 grams of xanthan gum were added to the mill and comminution continued for an additional hour, so that the silicon was comminuted with the distilled water for a total time of 5 hours. The slurry was separated from the milling balls and allowed to age for 16 hours. The aged slurry was spray-dried to a free-flowing powder using a PENTRONIX dryer with an atomizer wheel speed of 8000 rpm, an inlet temperature of 275° C. and an outlet temperature of 100° C. Total drying time was approximately 1 hour. This powder, upon nitridation, was calculated to have approximately 6.15 volume % liquid forming agents and 93.9% volume % silicon nitride as computed in the following example calculations:

Volume of $Si_3N_4$:

$$(3000 \text{ gm Si}) \frac{(1 \text{ mole Si})}{(28 \text{ gm Si})} \frac{(1 \text{ mole } Si_3N_4)}{(3 \text{ mole Si})} \frac{(140 \text{ gm } Si_3N_4)}{(\text{mole } Si_3N_4)}$$

$$\frac{(1 \text{ cc } Si_3N_4)}{(3.2 \text{ gm } Si_3N_4)} = 1562.5 \text{ cc } Si_3N_4$$

Volume of Liquid Forming Agents:
Volume $Fe_2O_3$ $$(90 \text{ gm } Fe_2O_3) \frac{(1cc \ Fe_2O_3)}{(5.24 \text{ gm } Fe_2O_3)} = 17.2 \text{ cc } Fe_2O_3$$

Volume $Y_2O_3$ $$(300 \text{ gm } Y_2O_3) \frac{(1cc \ Y_2O_3)}{(5.01 \text{ gm } Y_2O_3)} = 59.9 \text{ cc } Y_2O_3$$

Volume $Al_2O_3$ $$(100 \text{ gm } Al_2O_3) \frac{(1cc \ Al_2O_3)}{(3.965 \text{ gm } Al_2O_3)} = 25.2 \text{ cc } Al_2O_3$$

Total Volume of Liquid Forming Agents: 17.2 cc $Fe_2O_3$ + 59.9 cc $Y_2O_3$ + 25.2 cc $Al_2O_3$ = 102.3 cc Liquid Forming Agents Total Volume of $Si_3N_4$ and Liquid Forming Agents: 1562.5 cc $Si_3N_4$ + 102.3 cc Liquid Forming Agents = 1664.8 cc Thus the volume percentage of liquid and the volume percentage of each constituent is calculated as follows:

Volume Percent Of Liquid Forming Agents:

$$\frac{(102.3cc \text{ Liquid Forming Agents})}{1664.8cc \text{ Total}} \times 100\% = 6.15\%$$

Volume Percent of each Constituent:

Iron Oxide ($Fe_2O_3$)

$$\frac{17.2cc \ Fe_2O_3}{1664.8cc \text{ Total}} \times 100\% = 1.0\%$$

Yttria ($Y_2O_3$)

$$\frac{59.9 \text{ cc } Y_2O_3}{1664.8 \text{ cc Total}} \times 100\% = 3.6\%$$

Alumina ($Al_2O_3$)

$$\frac{25.2 \text{ cc } Al_2O_3}{1664.8 \text{ cc Total}} \times 100\% = 1.5\%$$

The spray-dried powder was consolidated into modulus of rupture (MOR) bars having dimensions of approximately 0.140 inches by 0.375 inches by 3.5 inches. These bars were shortened to 2.25 inches prior to nitriding. The bars were then placed in a nitriding furnace, which was evacuated to remove the ambient atmosphere. Then the furnace was backfilled with hydrogen gas, which was also flowed continuously through the furnace. The temperature of the furnace was raised from room temperature to 1000° C. over approximately a 2-hour period at a linear rate. At approximately 1000° C., the hydrogen atmosphere was first replaced by nitrogen, and then replaced by a nitriding atmosphere which consisted approximately of a mixture of 50 mole % helium, 2 mole % hydrogen, and 48 mole % nitrogen gases. After holding the temperature at 1000° C. for one hour, the temperature was linearly raised to 1410° C. over a 35-hour period, ending with an additional 1-hour hold at 1410° C. Pure nitrogen gas was automatically added to the furnace to maintain the nitrogen partial pressure concentration, as the nitrogen was consumed by the silicon during the conversion of the silicon to silicon nitride. The bars were then cooled to room temperature.

Ten (10) of the MOR bars were placed on reaction bonded silicon nitride (RBSN) supports, in an RBSN setter boat and covered with silicon nitride powder which contained yttria ($Y_2O_3$). The setter boat was covered with reaction bonded silicon nitride plates to prevent reaction with the atmosphere of the sintering furnace. The setter boat containing the bars was placed in a graphite furnace which had been evacuated and purged with argon under vacuum. The furnace temperature was increased from room temperature to a temperature of 1420° C. over a 2-hour time period. At approximately 700° C., the vacuum was replaced with a nitrogen atmosphere at a pressure of approximately 40 psig. To effect the sintering, the temperature was further increased to 1740° C. over an additional 5 hours and held at 1740° C. for 4 hours. The bars were then cooled to room temperature over an 8-hour time period.

The 10 bars were ground into test bars by Bomas Machine Specialties, Sommerville, Mass., and then tested in 4-point bending at Coors Analytical Laboratories, Golden, Colo. The test results are shown as Example 1 in Table I.

EXAMPLE 2

Using the spray-dried powder of Example 1, six modulus of rupture bars were prepared by die pressing. The modulus of rupture bars were then nitrided by placing them in a furnace and increasing the temperature of the furnace linearly from room temperature to 1000° C. in 2 hours, while flowing hydrogen through the furnace.

Once the furnace temperature reached 1000° C., the atmosphere in the furnace was replaced with a nitriding gas of 50 mole % He, 2 mole % $H_2$ and 48 mole % $N_2$. The furnace temperature was then held at 1000° C. for 1 hour, then, linearly, the temperature was increased from 1000° C. to 1354° C. over 24 hours. The furnace temperature was held at 1354° C. for 7 hours, then allowed to cool to room temperature. The bars were then reheated in the nitriding furnace from room temperature to 1300° C. over a 2 hour period under an atmosphere of 50 mole % He, 2 mole % $H_2$, and 48 mole % $N_2$. The furnace temperature was then increased to 1435° C. using a linear temperature ramp over a 9½-hour period, with a temperature hold at 1435° C. for 1 hour before cooling to room temperature.

The 6 MOR bars were packed in an RBSN setter and covered with silicon nitride cover powder which contained yttria, and the assembly was covered with an RBSN plate. This assembly was heated under vacuum in a graphite furnace from room temperature to 1340° C. over a 2-hour period. The furnace was purged three times with argon while the furnace was at room temperature and purged twice with argon during the initial heating of the furnace. At approximately 1400° C., the furnace was pressurized to 40 psig with nitrogen gas, and remained pressurized until the conclusion of the sintering cycle. The furnace temperature was raised linearly from 1340° C. to 1810° C. over a 5-hour period and held at 1810° C. for 2½ hours to effect sintering. After sintering, the furnace was cooled to room temperature over a 5-hour period. The sintered MOR bars were easily removed from the cover powder and were then ground into test bars by Bomas Machine Specialties. Six bars were tested in 4-point bending at Coors Analytical Laboratories, with the results given as Example 2 in Table I.

EXAMPLE 3

1000 grams of silicon, 30 grams of iron oxide ($Fe_2O_3$), 40 grams alumina ($Al_2O_3$), 200 grams of 96% ceria (Molycorp grade 5310 $CeO_2$) and 1000 milliliters of distilled water were comminuted in an 11.3 liter porcelain jar mill using 7 kg of ¾ inch diameter alumina balls for 3 hours. Then organic binders and viscosity modifiers consisting of 15 grams of polyvinyl alcohol, 5 grams of polyethylene glycol, 10 grams of glycerol, and 2.5 grams of xanthan gum and 270 ml of distilled water were added to the mill, and comminution was continued for an additional hour before the slurry was separated from the balls. Total comminution time of the silicon with the water was 4 hours. Two additional batches of the silicon-ceria-iron oxide-alumina-water slurry were prepared in an identical manner, and the slurries were combined and allowed to age for approximately 16 hours. The combined slurries were then spray-dried to obtain a free-flowing granular powder using a Pentronix Dryer, operated at a rotor speed of 8200–8300 rpm, an inlet temperature of 295° C., and an outlet temperature of 90° C. This powder, upon nitridation, was expected to have approximately 7.7 volume % liquid forming agents and 92.3 volume % silicon nitride as computed in the following example calculations:

Volume of $Si_3N_4$ $$(3000 \text{ gm Si}) \frac{(1 \text{ mole Si})}{(28 \text{ gm Si})} \frac{(1 \text{ mole } Si_3N_4)}{(3 \text{ mole Si})} \frac{(140 \text{ gm } Si_3N_4)}{(\text{mole } Si_3N_4)}$$

$$\frac{(1 \text{ cc } Si_3N_4)}{(3.2 \text{ gm } Si_3N_4)} = 1562.5 \text{ cc } Si_3N_4$$

Volume of Liquid Forming Agents:
Volume $Fe_2O_3$ $$(90 \text{ gm } Fe_2O_3) \frac{(1 \text{ cc } Fe_2O_3)}{(5.24 \text{ gm } Fe_2O_3)} = 17.2 \text{ cc } Fe_2O_3$$

Volume $CeO_2$
Note: At the sintering temperature, the active phase of $CeO_2$ is $Ce_2O_3$ and: $2 CeO_2 \rightleftharpoons Ce_2O_3 + \frac{1}{2} O_2$
Therefore:

$$(600 \text{ gm } CeO_2) \frac{(1 \text{ mole } CeO_2)(1 \text{ mole } Ce_2O_3)(328 \text{ gm } Ce_2O_3)}{(172 \text{ gm } CeO_2)(2 \text{ mole } CeO_2)(1 \text{ mole } Ce_2O_3)}$$

$$\frac{(1 \text{ cc } Ce_2O_3)}{(6.86 \text{ gm } Ce_2O_3)} = 83.4 \text{ cc } Ce_2O_3$$

Volume $Al_2O_3$ $$(120 \text{ gm } Al_2O_3) \frac{(1 \text{ cc } Al_2O_3)}{(3.965 \text{ gm } Al_2O_3)} = 30.3 \text{ cc } Al_2O_3$$

Total Volume of Liquid Forming Agents: 17.2 cc $Fe_2O_3$ + 83.4 cc $Ce_2O_3$ + 30.3 cc $Al_2O_3$ = 130.9 cc Liquid Forming Agents Total Volume of $Si_3N_4$ and Liquid Forming Agents: 1562.5 cc $Si_3N_4$ + 130.9 cc Liquid Forming Agents = 1693.4 cc Volume Percent Of Liquid Forming Agents $$\frac{130.9 \text{ cc Liquid Forming Agents}}{1693.4 \text{ cc Total}} \times 100\% = 7.73\%$$

Volume Percentage of each Constituent:

Iron Oxide ($Fe_2O_3$)

$$\frac{17.2 \text{ cc } Fe_2O_3}{1693.4 \text{ cc total}} \times 100\% = 1.0\%$$

Ceria ($Ce_2O_3$)

$$\frac{83.4 \text{ cc } Ce_2O_3}{1693.4 \text{ cc total}} \times 100\% = 4.9\%$$

Alumina ($Al_2O_3$)

$$\frac{30.3 \text{ cc } Al_2O_3}{1693.4 \text{ cc total}} \times 100\% = 1.8\%$$

The ceria used was about 96% pure ceria and about 4% other rare earth oxides, principally lanthanum oxide (typically about 3%) and neodymium oxide (typically about 1.5%). Since these oxides would also constitute appropriate liquid forming agents and have densities similar to ceria, the slight error incurred by ignoring their presence was considered negligible.

The spray-dried powder was then pressed into modulus of rupture (MOR) test bars of dimension 0.375 inches by 0.170 inches by 3.5 inches using an industry-standard powder metal press. The bars were subsequently cut to approximately 2.5 inches prior to nitriding.

The 2.5-inch bars were then placed in a nitriding furnace which was evacuated to remove the ambient atmosphere. The furnace was then backfilled with hydrogen gas, which also flowed continuously through the furnace. The temperature of the furnace was raised from room temperature to 1000° C. over approximately 2 hours at a linear rate. At approximately 860° C., the hydrogen atmosphere was replaced by a nitrogen purge, and then the furnace was evacuated until 1000° C. was reached. At 1000° C., a nitriding atmosphere consisting of approximately 50 mole % helium, 2 mole % hydrogen, and 48 mole % nitrogen was used to fill the furnace. The temperature was increased linearly from 1000° C. to 1440° C. over a 32-hour period, with an additional 1-hour hold at 1440° C.

During nitridation, nitrogen gas was automatically added to the furnace as needed to maintain the original nitrogen concentration because nitrogen was consumed by the silicon during the conversion of the silicon to silicon nitride. The bars were then cooled to room temperature.

Eight of the MOR bars were placed in a reaction bonded silicon nitride setter box of the type described in the co-pending application "Use of RBSN Setters For The Sintering Of Silicon Nitride Ceramics As An Alternative For Cover Powder". The MOR bars were supported on RBSN supports within the setter boxes, and no cover powder was employed. The box with the MOR bars was placed in a graphite furnace. Several purges of the furnace with nitrogen gas was then performed. The furnace was then heated under vacuum to 500° C., and nitrogen gas was flowed at a very slow rate through the furnace so that the pressure in the furnace was maintained at approximately atmospheric for the rest of the sintering cycle. To sinter the silicon nitride body, the heating of the furnace from room temperature to 1730° C. was accomplished at a linear rate over a 3-hour period. The furnace temperature was then held constant at 1730° C. for 4 hours, and allowed to cool to room temperature over a 3-hour period. The resulting sintered bars were removed from the RBSN setter box and showed no tendency to adhere to the RBSN supports in the box. The MOR bars were sent to Bomas Machine Specialties for grinding into test bars, which were tested in 4-point MOR at Coors Analytical Laboratories. The test results are shown in Table I as Example 3.

TABLE I

| Examle | Density Avg. (gm/cc) | M.O.R. Avg. (Kpsi) | MOR Range (Kpsi) | # of Bars |
|---|---|---|---|---|
| 1 | 3.17 | 59.6 | 52.5–68.9 | 10 |
| 2 | 3.16 | 68.4 | 51.3–77.2 | 6 |
| 3 | 3.31 | 68 | 64–78 | 8 |

While our invention has been described in terms of a few specific examples and configurations, it will be appreciated that other forms could readily be adapted by one skilled in the art. Accordingly, the scope of our invention is to be considered limited only by the following claims.

What is claimed is:

1. A process for preparing an alpha-phase silicon nitride material and thereafter sintering to a densified beta-phase silicon nitride material, comprising:
   (a) comminuting a slurry including a mixture of
      (i) silicon-containing powder,
      (ii) water, and
      (iii) at least one densification aid to aid in later densifying of the silicon nitride material,
   said comminuting being performed to form fresh, non-oxidized surfaces on the silicon powder and to allow substantial chemical reaction between the silicon and the water, yielding a mass;
   (b) nitriding the mass by exposure to a sufficient amount of a nitriding gas including at least nitrogen at a sufficient temperature for a sufficient length of time to form a mass of substantially alpha-phase silicon nitride; and
   (c) sintering the resultant silicon nitride mass at a sintering holding temperature of from about 1450° C. to about 2100° C. for a sufficient length of time to convert the silicon nitride from a predominantly alpha-phase material to a predominantly densified beta phase silicon nitride material exhibiting a decrease in bulk volume of the silicon nitride due to the densification.

2. The process of claim 1, wherein said comminuting is performed by a method selected from the group consisting of ball milling, rod milling, vibratory grinding, atterition milling, jet milling, cone grinding, jaw crushing, and hammer milling.

3. The process of claim 1, wherein said comminuting is performed for greater than two hours.

4. The process of claim 1, wherein said comminuting is performed until the silicon powder size is predominantly less than 10 microns.

5. The process of claim 1, wherein the at least one densification aid is selected from the group consisting of rare earth metal oxides, MgO, $ZrO_2$, $TiO_2$, BaO, SrO, $Sc_2O_3$, $B_2O_3$, BeO, $Cr_2O_3$, CaO, $V_2O_5$, $MnO_2$, MgN, AlN, $Al_2O_3$, MgSi, $MgAl_2O_4$, and mixtures thereof.

6. The process of claim 1, wherein the at least one densification aid is included in the slurry at about 0.5 to 15 volume percent, based on the volume of the resultant silicon nitride.

7. The process of claim 1, wherein said at least one densification aid is employed in an amount so as to achieve a total 4 to 12 volume percent based on the volume of the resultant silicon nitride.

8. The process of claim 1, further comprising admixing a dispersing aid into the slurry in the comminuting step.

9. The process of claim 1, further comprising reducing the water content of the reacted slurry to a degree sufficient to form a resultant dry mass.

10. The process of claim 9, further comprising admixing organic additives to the slurry before substantially reducing its water content to effect the physical properties of the silicon mixture.

11. The process of claim 10, wherein said organic additives are selected from the group consisting of binders, lubricants, plasticizers, and viscosity modifiers including dispersing agents.

12. The process of claim 10, wherein said admixing is accomplished by comminuting the slurry with the organic additives for at least 30 minutes after said organic additives are admixed.

13. The process of claim 1, further comprising the step of at least periodically venting the evolving gases from the reacting slurry.

14. The process of claim 1, further comprising a step of aging the comminuted slurry in the absence of comminuting for a period of time sufficient to allow the chemical reaction to be substantially completed.

15. The process of claim 9, wherein reducing the water content is performed by a method selected from the group consisting of spray drying, slip casting, extrusion, injection molding, and tape casting.

16. The process of claim 9, further comprising a step of forming the resulting dry mass into an article before exposing the article to the nitriding gas, said forming being performed by a method selected from the group consisting of isopressing, dry pressing, extruding, and injection molding.

17. The process of claim 10, further comprising a step of placing the resultant dry mass into a furnace and filling the furnace with a combustible gas atmosphere while increasing the temperature from about room temperature to about 1000° C. over a time period from about 1 to about 5 hours while flowing the combustible gas therethrough, such that the organic additives are substantially burned off without causing any significant damage to the dry mass.

18. The process of claim 17, wherein said combustible gas atmosphere includes hydrogen gas.

19. The process of claim 1, wherein the composition of the nitriding gas remains substantially constant throughout the nitriding step by monitored addition of pure nitrogen.

20. The process of claim 1, wherein the nitriding gas includes substantially pure nitrogen.

21. The process of claim 1, wherein the nitriding gas includes substantially nitrogen and helium.

22. The process of claim 1, wherein the nitriding gas includes substantially nitrogen, helium and hydrogen.

23. The process of claim 1, wherein said nitriding gas comprises from about 40 to about 60 mole percent nitrogen, from about 40 to about 60 mole percent helium, and from about 1 to about 4 mole percent hydrogen.

24. The process of claim 1, wherein said nitriding step is performed while heating at an increasing temperature rate of from about 5° C. to about 50° C. per hour until an elevated temperature of about 1350° C. to about 1450° C. is reached.

25. The process of claim 1, wherein said nitriding step begins at about 1000° C. and is performed while heating at an increasing temperature rate of from about 5° C. to about 50° C. per hour until an elevated temperature of about 1350° C. to about 1450° C. is reached.

26. The process of claim 1, wherein the nitriding step is performed while the temperature rate is a 15°-25° C. increase per hour.

27. The process of claim 1, wherein the increasing temperature rate during nitriding is substantially linear.

28. The process of claim 1, further comprising holding the temperature achieved during the nitriding step between about 1350° C. to about 1450° C. for less than 2 hours.

29. The process of claim 1, wherein said sintering includes utilizing at least a nitrogen-containing atmosphere during the sintering.

30. The process of claim 1, wherein said sintering includes utilizing an atmosphere containing at least nitrogen and helium during the sintering.

31. The process of claim 1, wherein said sintering includes utilizing an atmosphere containing at least nitrogen and hydrogen during the sintering.

32. The process of claim 1, wherein said sintering includes utilizing an atmosphere containing at least nitrogen, helium and hydrogen during the sintering.

33. The process of claim 1, wherein said sintering includes utilizing the same atmosphere as the atmospheric gas used during the nitriding step.

34. The process of claim 1, wherein said sintering includes utilizing an atmosphere containing substantially pure nitrogen.

35. The process of claim 1, wherein the silicon nitride body is heated under vacuum from the end of the nitriding step to the beginning of the sintering temperature hold step, then an atmosphere containing at least nitrogen is admitted during the duration of the sintering step.

36. The process of claim 1, wherein said sintering step is accomplished while utilizing the sintering atmosphere at a pressure of from vacuum to atmospheric pressure.

37. The process of claim 1, wherein said sintering step is accomplished while utilizing the sintering atmosphere at a pressure of from atmospheric to about 1500 psig.

38. The process of claim 1, wherein said sintering step is accomplished by sintering in an atmosphere containing at least nitrogen wherein the pressure is between about atmospheric to about 100 psig.

39. The process of claim 1, wherein said sintering step is accomplished while utilizing a sintering atmosphere of atmospheric to 50 psig.

40. The process of claim 1, wherein said sintering step is accomplished while utilizing a sintering atmosphere including nitrogen at a partial pressure greater than 50 psig.

41. The process of claim 1, wherein said sintering step is accomplished while heating from the temperature achieved at the end of the nitriding step to the beginning of the sintering step at an increasing rate of from about 250° C. to about 1250° C. per hour until an elevated temperature of about 1450° C. to about 2100° C. is reached.

42. The process of claim 1, wherein the dry mass is further compacted during sintering at pressures up to 20,000 psig.

43. The process of claim 1, wherein said increasing rate includes from about 500° C. to about 1000° C. per hour until the elevated temperature is reached.

44. The process of claim 1, wherein said increasing rate includes about 500° C. per hour until the elevated temperature is reached.

45. The process of claim 1, wherein said sintering step is accomplished by maintaining a temperature of between about 1450° C. to about 2100° C. until substantially all of the alpha-phase silicon nitride is converted to densified beta phase silicon nitride.

46. The process of claim 1, wherein said sintering step is accomplished by maintaining a sintering temperature of between about 1650° C. to about 1850° C. until substantially all of the alpha-phase silicon nitride is converted to densified beta phase silicon nitride.

47. The process of claim 1, wherein said sintering step is accomplished by maintaining the sintering temperature for about 0.3 to about 20 hours.

48. The process of claim 1, wherein said sintering step is accomplished by maintaining the sintering temperature for about 5 to about 10 hours.

49. The process of claim 1, wherein said sintering step is accomplished by maintaining the sintering temperature for about 1 to about 2 hours.

50. The process of claim 1, further comprising cooling down the resulting densified silicon nitride mass from the sintering temperature to room temperature at a rate of from about 250° C. to about 1250° C. per hour.

51. The process of claim 50, wherein said cooling down occurs at a rate of from about 500° C. to about 1000° C. per hour until room temperature is reached.

52. The process of claim 50, wherein said cooling down occurs at about 500° C. per hour until room temperature is reached.

53. The process of claim 1, further comprising a step of adding at least one nitriding agent into the silicon and water slurry.

54. The process of claim 53, wherein said adding of at least one nitriding agent is accomplished before the comminution step is completed.

55. The process of claim 53, wherein said adding of at least one nitriding agent is accomplished after the comminution step is completed.

56. The process of claim 53, wherein the at least one nitriding agent is selected from the group consisting of iron oxides, lead oxides, nickel carbonyl, nickel oxides, silicon carbide, graphite, carbon, aluminum oxides, CoO, CaF, $Li_2O$, $Na_2O$, $K_2O$, BaO, BN, albite ($NaAlSi_3O_8$), orthclase ($KAlSi_3O_8$), anorthite ($CaAl_2Si_2O_8$), nepheline syenite, talc, borax, soda ash, alpha-phase $Si_3N_4$ and mixtures thereof.

57. The process of claim 1, further comprising compacting the dry mass before nitriding.

58. The process of claim 1, further comprising compacting the mass of substantially alpha-phase silicon nitride resulting from the nitriding step into a compacted article before the step of sintering to beta-phase silicon nitride.

59. The process of claim 1, wherein the step of comminuting is accomplished by employing the slurry components in amounts such that the slurry contains about 10 to 60 volume percent solids and about 90 to 40 volume percent water.

60. A process for preparing an alpha-phase silicon nitride material and thereafter sintering to a densified beta-phase silicon nitride material, comprising:
(a) comminuting a slurry including a mixture of
  (i) silicon powder,
  (ii) water,
  (iii) at least one nitriding agent selected from the group consisting of iron oxides, lead oxides, nickel carbonyl, nickel oxides, silicon carbide, graphite, carbon, aluminum oxides, CoO, CaF, $Li_2O$, $Na_2O$, $K_2O$, BaO, BN, albite ($NaAlSi_2O_8$), orthclase ($KAlSi_3O_8$), anorthite ($CaAl_2Si_2O_8$), nepheline syenite, talc, borax, soda ash, alpha-phase $Si_3N_4$ and mixtures thereof for aiding in further processing steps, and
  (iv) at least one densification aid selected from the group consisting of rare earth metal oxides, MgO, $ZrO_2$, $TiO_2$, BaO, SrO, $Sc_2O_3$, $B_2O_3$, BeO, $Cr_2O_3$, CaO, $V_2O_5$, $MnO_2$, MgN, AlN, $Al_2O_3$, MgSi, $MgAl_2O_4$, and mixtures thereof, said comminuting being performed to form fresh, non-oxidized surfaces on the silicon powder and to allow substantial chemical reaction between the silicon and the water;
(b) reducing the water content of the reacted slurry to a degree sufficient to form a resultant dry mass;
(c) nitriding the dry mass by exposure to a sufficient amount of a nitriding gas including at least nitrogen, helium and hydrogen at a sufficient temperature for a sufficient length of time to form a mass of substantially alpha-phase silicon nitride said nitriding being performed while maintaining a constant partial pressure of nitrogen; and
(d) heating the resultant silicon nitride mass at about 1450° C. to about 2100° C. for a sufficient length of time to convert the silicon nitride from a predominantly alpha-phase material to a predominantly densified beta phase silicon nitride material exhibiting a decrease in bulk volume of the silicon nitride mass due to the densification.

* * * * *